(12) United States Patent
Azadet et al.

(10) Patent No.: US 8,385,489 B2
(45) Date of Patent: Feb. 26, 2013

(54) METHODS AND APPARATUS FOR WIRELESS CHANNEL ESTIMATION USING INTERPOLATION ELIMINATION IN THE EIGEN DOMAIN

(75) Inventors: Kameran Azadet, Morganville, NJ (US); Samer Hijazi, Bethlehem, PA (US); Albert Molina, Madrid (ES); Joe H. Othmer, Ocean, NJ (US); Ramon Sanchez, Madrid (ES)

(73) Assignee: LSI Corporation, San Jose, CA (US)

( * ) Notice: Subject to any disclaimer, the term of this patent is extended or adjusted under 35 U.S.C. 154(b) by 717 days.

(21) Appl. No.: 12/547,298

(22) Filed: Aug. 25, 2009

(65) Prior Publication Data

US 2011/0051867 A1 Mar. 3, 2011

(51) Int. Cl.
*H04B 1/10* (2006.01)
(52) U.S. Cl. ........ 375/350; 375/232; 375/346; 375/348; 375/349
(58) Field of Classification Search .......... 375/229–232, 375/259, 260, 316, 346–350
See application file for complete search history.

(56) References Cited

U.S. PATENT DOCUMENTS

2010/0111232 A1* 5/2010 Papadopoulos et al. ...... 375/340
2011/0310848 A1* 12/2011 Ma et al. ...................... 370/331

* cited by examiner

*Primary Examiner* — David C. Payne
*Assistant Examiner* — James M Perez
(74) *Attorney, Agent, or Firm* — Ryan, Mason & Lewis, LLP

(57) ABSTRACT

Methods and apparatus are provided for wireless channel estimation using interpolation elimination in the Eigen domain. Channel components at known OFDM symbol locations are interpolated to other OFDM symbol locations. Methods and apparatus are provided for interpolating in the Eigen domain between reference signals (i.e., training signals) to estimate the equalizer coefficients with a reduced complexity. In particular, one aspect of the present invention performs the required interpolation before a required matrix inversion in the Eigen domain.

18 Claims, 3 Drawing Sheets

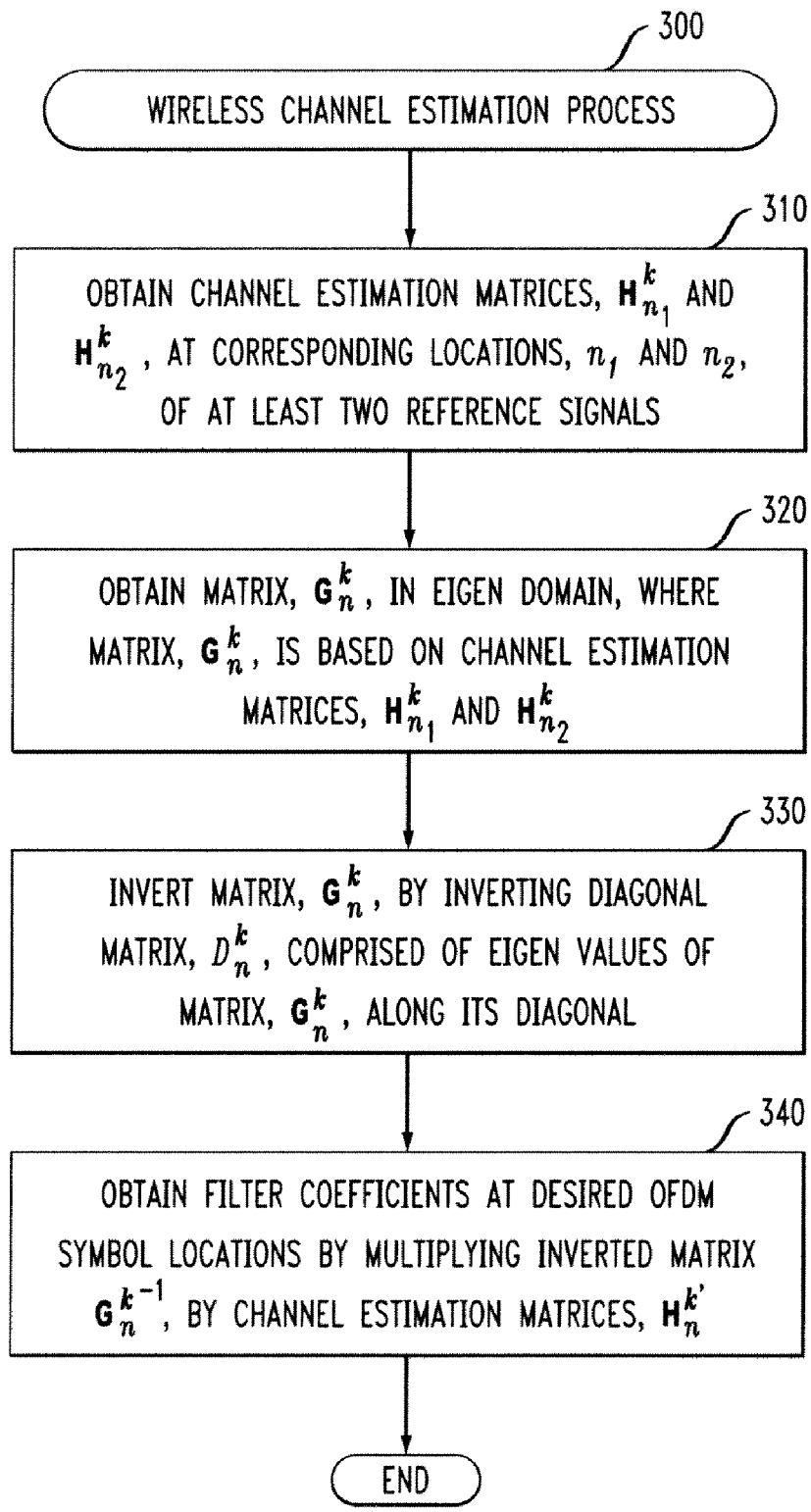

METHODS AND APPARATUS FOR WIRELESS CHANNEL ESTIMATION USING INTERPOLATION ELIMINATION IN THE EIGEN DOMAIN

FIELD OF THE INVENTION

The present invention is related to channel estimation techniques and, more particularly, to channel estimation techniques for wireless networks.

BACKGROUND OF THE INVENTION

Wireless communication systems support wireless communication among a number of terminals (often referred to as user equipment). Typically, each wireless terminal communicates with a base station over a wireless channel comprised of a forward link and a reverse link. The forward link (also known as the downlink) refers to communications from the base station to the user terminal, while the reverse link (also known as the uplink) refers to communications from the user terminal to the base station.

Orthogonal frequency-division multiplexing (OFDM) is a frequency-division multiplexing (FDM) scheme often employed in wireless communication systems. Closely-spaced orthogonal sub-carriers are used to carry data that is typically divided into several parallel data streams or channels (one for each sub-carrier). Each sub-carrier is modulated with a conventional modulation scheme at a low symbol rate, thereby maintaining total data rates similar to conventional single-carrier modulation schemes in the same bandwidth. LTE (Long Term Evolution) techniques have been proposed for a fourth generation (4G) of wireless communication systems with improved throughput and performance. In an LTE wireless network, wireless resources are assigned using frequency domain scheduling to the uplink and the downlink.

Channel estimation is an important issue in a wireless communication system, such as OFDM systems. Among other benefits, the obtained channel information allows coherent detection to be employed. In order to satisfy the throughput and performance demands of emerging wireless networks, sophisticated signal processing techniques are employed that require knowledge of the channel. For example, the independent sub-channels in OFDM systems improve transmitter performance by adjusting the bit rate and transmit power across sub-channels according to their channel conditions.

In an exemplary LTE system, the channel is estimated by processing reference information in the received OFDM symbols. For an exemplary LTE uplink, for example, each resource block is composed of 14 OFDM symbols. Symbols 4 and 11 carry reference signals that are used for channel estimation. The channel can be directly estimated at these two locations. In order to estimate the channel at other locations, however, the known channel components are interpolated or extrapolated to all other OFDM symbol locations to obtain the desired equalizer filter coefficients at other symbol locations. This process requires an interpolation, and consequently a matrix inversion, at every interpolated OFDM location, resulting in a rather high computational complexity.

A need therefore exists for improved techniques for interpolating channel components at known OFDM symbol locations to other OFDM symbol locations. A further need exists for methods and apparatus for improved wireless channel estimation using interpolation elimination in the Eigen domain.

SUMMARY OF THE INVENTION

Generally, methods and apparatus are provided for wireless channel estimation using interpolation elimination in the Eigen domain. According to one aspect of the present invention, channel components at known OFDM symbol locations are interpolated to other OFDM symbol locations. According to another aspect of the invention, methods and apparatus are provided for interpolating in the Eigen domain between reference signals (i.e., training signals) to estimate the equalizer coefficients with a reduced complexity. In particular, one aspect of the present invention performs the required interpolation before a required matrix inversion in the Eigen domain. As used herein, the term "interpolate" shall also include an extrapolation for OFDM symbol locations that are not between two known OFDM symbol locations.

The filter coefficients are obtained at an $n^{th}$ symbol location and a $k^{th}$ sub-carrier, to compensate for a wireless channel. An exemplary method comprises obtaining channel estimation matrices, $H_{n_1}^{k}$ and $H_{n_2}^{k}$, at corresponding locations, $n_1$ and $n_2$, of at least two reference signals; obtaining a matrix, $G_n^{k}$, in an Eigen domain, wherein the matrix, $G_n^{k}$, is based on the channel estimation matrices, $H_{n_1}^{k}$ and $H_{n_2}^{k}$; inverting the matrix, $G_n^{k}$, by inverting a diagonal matrix, $D_n^{k}$, comprised of the Eigen values of the matrix, $G_n^{k}$, along its diagonal; and determining the filter coefficients using the inverted matrix $G_n^{k^{-1}}$.

For an exemplary Minimum Mean Square Error (MMSE) filter, the filter coefficients can be determined by multiplying the inverted matrix $G_n^{k^{-1}}$, by the channel estimation matrices, $H_n^{k'}$. In one exemplary embodiment, the filter coefficients are obtained as follows:

$$M_n^k = H_n^{k'}(H_n^k H_n^{k'} + \sigma^2 I)^{-1},$$

where $\sigma$ is a noise variance constant.

A more complete understanding of the present invention, as well as further features and advantages of the present invention, will be obtained by reference to the following detailed description and drawings.

BRIEF DESCRIPTION OF THE DRAWINGS

FIG. 3 is a flow chart describing an exemplary implementation of a wireless channel estimation process incorporating features of the present invention.

DETAILED DESCRIPTION

The present invention provides improved methods and apparatus for interpolating channel components at known OFDM symbol locations to other OFDM symbol locations. According to another aspect of the invention, methods and apparatus are provided for interpolating in the Eigen domain between reference signals (i.e., training signals) to estimate the equalizer coefficients with a reduced complexity. In particular, one aspect of the present invention performs the required interpolation before the inversion in the Eigen domain. The present invention recognizes that interpolation in the Eigen domain allows inversion by simply inverting scalar Eigen values. As used herein, the term "interpolate" shall also include an extrapolation for OFDM symbol locations that are not between two known OFDM symbol locations.

Figure 1:
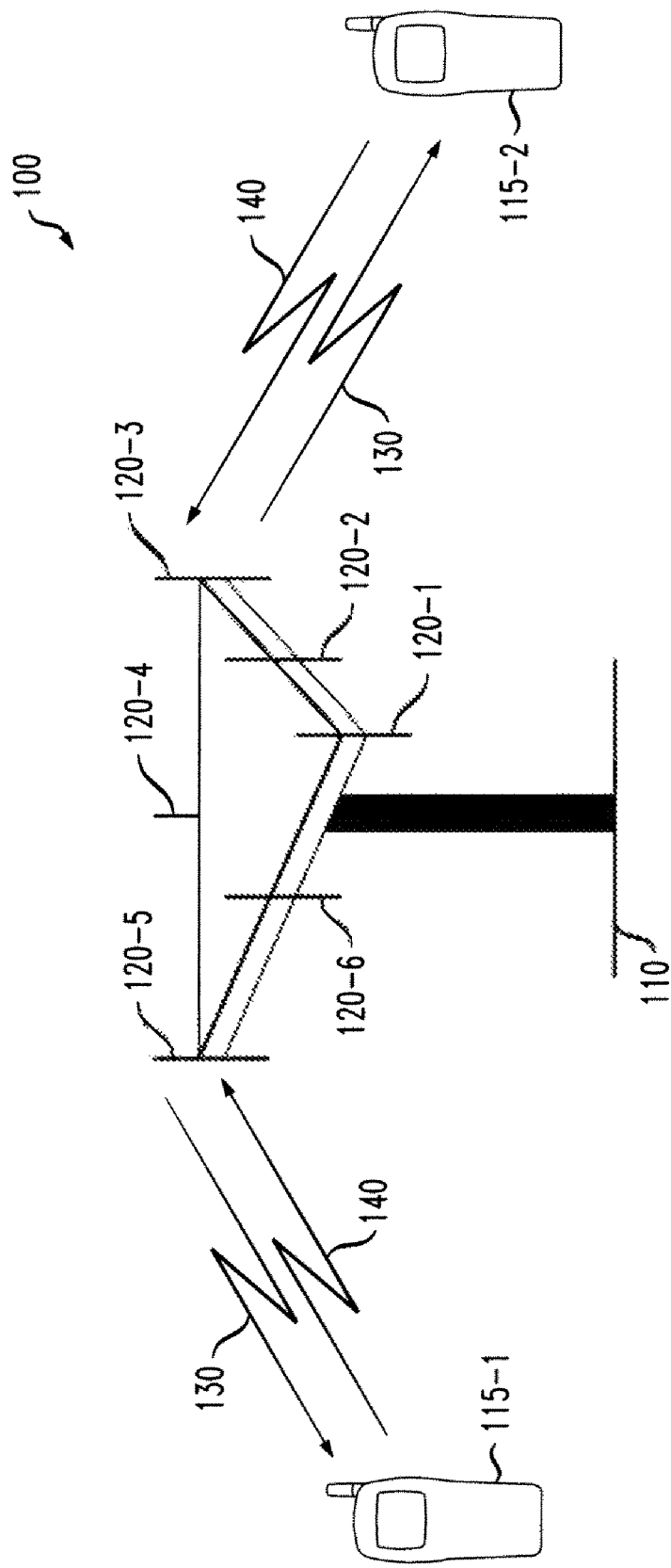
FIG. 1 illustrates an exemplary multiple access wireless communication system in which the present invention can operate.

FIG. 1 illustrates an exemplary multiple access wireless communication system 100 in which the present invention can operate. The exemplary wireless communication system 100 comprises one or more base stations 110 communicating with one or more user devices, such as user devices 115-1 and 115-2 (hereinafter, collectively referred to as "user devices 115"). The exemplary base station 110 typically comprises multiple antennas 120-1 through 120-6. A forward link (or downlink) 130 indicates the communication link from a base station 110 to a user device 115, and a reverse link (or uplink) 140 indicates the communication link from a user device 115 to a base stations 110. It is noted that the channel estimation techniques discussed further below in conjunction with FIG. 3 are typically performed by a processor in the base station 110.

According to one aspect of the present invention, techniques are provided for channel estimation in the exemplary wireless communication system 100. While the present invention is illustrated in the context of computing coefficients for an exemplary Minimum Mean Square Error (MMSE) filter for an exemplary LTE wireless communication system 100, the present invention can be applied to any filter in any wireless network environment, where the channel is known at some locations in the time and/or frequency grid (where the pilot signals are located) and must be interpolated to other locations.

Figure 2:
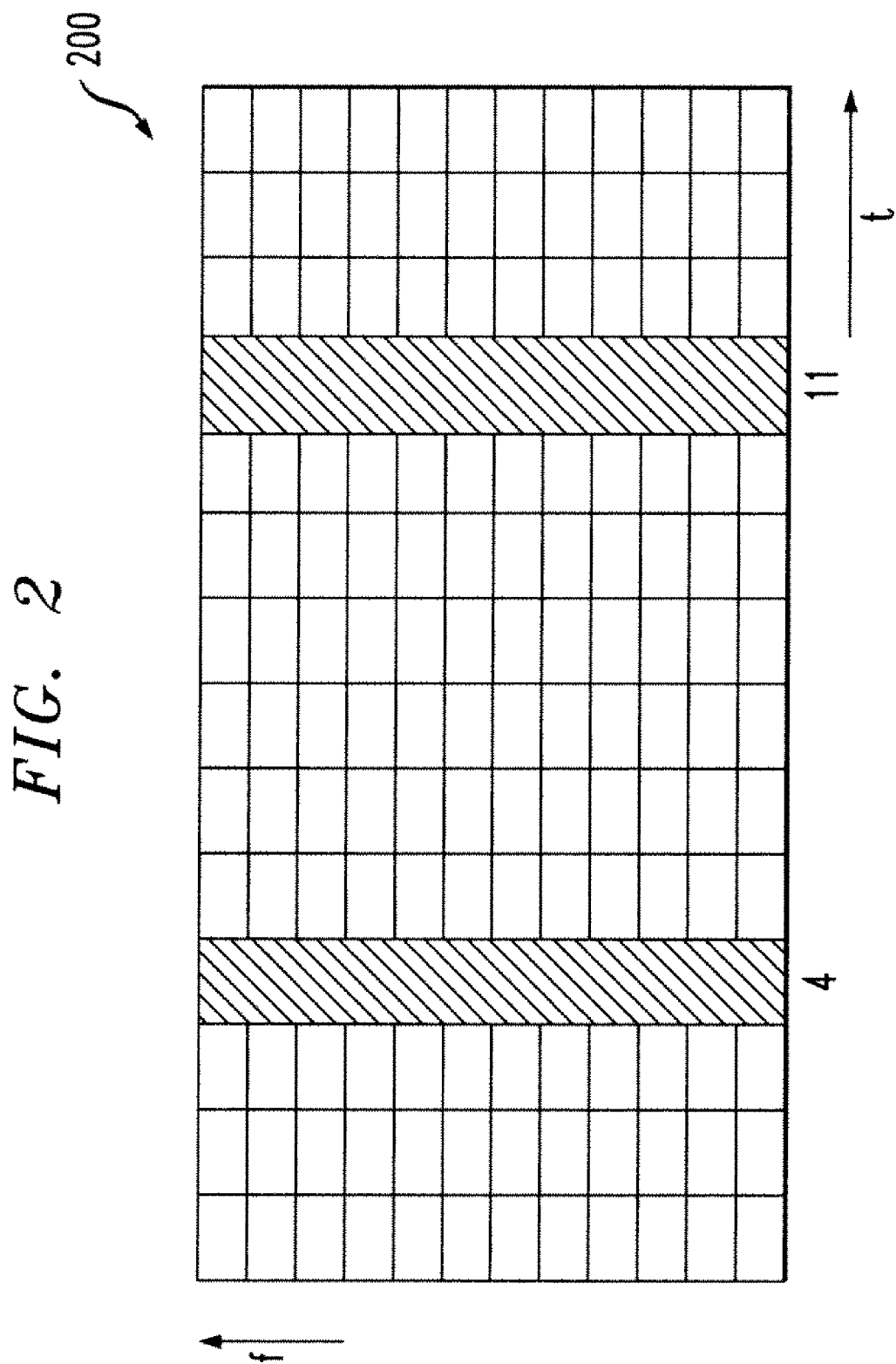
FIG. 2 illustrates an exemplary channel (time/frequency) grid for an exemplary LTE uplink channel.

FIG. 2 illustrates an exemplary channel (time/frequency) grid 200 for an exemplary LTE uplink channel. In the exemplary uplink LTE system, each resource block 200 is composed of 14 OFDM symbols along the time axis and 12 sub-carriers along the frequency axis. As previously indicated, symbols 4 and 11 carry reference signals in the exemplary LTE uplink channel. Hence, the channel can be directly estimated only at these two locations (e.g., $H_4^k$ and $H_{11}^k$), in a known manner, and has to be interpolated to all other OFDM symbol locations. Then, the equalizer filter coefficients can be computed. For instance, the MMSE filter at the $n^{th}$ OFDM symbol and the $k^{th}$ subcarrier can be computed as follows:

$$M_n^k = H_n^{k'}(H_n^k H_n^{k'} + \sigma^2 I)^{-},$$

where $\sigma$ is a noise variance constant. Thus, a matrix inversion is required at every interpolated location. Depending on the speed of the mobile user devices 115, it might be necessary to interpolate, and consequently invert, at every interpolated OFDM location. This could result in a rather high computation complexity. For this reason a simplification to reduce the complexity is necessary.

It can be seen that the MMSE matrix can be broken into two components, $$M_n^k = H_n^{k'} G_n^{k-1} \ni G_n^k = (H_n^k H_n^{k'} + \sigma^2 I)$$

Hence, $M_n^k$ computation complexity can be reduced by interpolating $M_4^k$, and $M_{11}^k$, or $G_4^{k-1}$ and $G_{11}^{k-1}$ directly. However, this interpolation after the matrix inversion might result in significant degradation in performance. To overcome this limitation, one aspect of the present invention performs the interpolation before the inversion in the Eigen domain.

The advantage of performing the interpolation in the Eigen domain is the fact that inverting after interpolation is simply performed by inverting the scalar Eigen values. As $G_n^k$ is a Hermitian matrix, expressed as follows:

$$G_n^k = V_n^k D_n^k V_n^{k'}$$

where $V_n^k$ is the Eigen vectors matrix and is a unitary matrix; $D_n^k$ is real diagonal matrix with the Eigen values of $G_n^k$ along its diagonal. Consequently, $G_n^{k-1} = V_n^k D_n^{k-1} V_n^{k'}$, where $D_n^{k-1}$ is computed by inverting only the diagonal elements of $D_n^k$. The interpolation problem is thus reduced to interpolating the scalar Eigen components. The Eigen values $D_n^k$, can be estimated utilizing a linear interpolation between $D_4^k$, and $D_{11}^k$, and between $V_4^k$, and $V_{11}^k$.

To perform the interpolating in the Eigen domain, $G_n^k$ can be rewritten as follows:

$$G_n^k = (Q_h^{n,k} + \sigma^2 I)$$
$$= (V_q^{n,k} D_q^{n,k} V_q^{n,k'} + \sigma^2 I)$$
$$= V_q^{n,k}(D_q^{n,k} + \sigma^2 I) V_q^{n,k'}$$
$$= V_q^{n,k}\left(\sqrt{D_q^{n,k}} \sqrt{D_q^{n,k}} + \sigma^2 I\right) V_q^{n,k'}$$

Thus, to perform a linear interpolation of the channel matrix, a direct linear interpolation on the $\sqrt{D_q^{n,k}}$ matrix is needed. At the same time, a geometric interpolation between the column spaces of $V_q^{4,k}$ and $V_q^{11,k}$ is also needed. For instance, to find the mid-point orthogonal vector space between $V_q^{4,k}$ and $V_q^{11,k} V_q^{MID,k}$ (i.e., $V_q^{4,k'} V_q^{MID,k} = V_q^{MID,k'} V_q^{11,k}$ while $V_q^{MID,k} V_q^{MID,k'} = I$). To solve this problem, the following expressions are defined:

$$Z_q^{MID,k} = V_q^{4,k'} V_q^{MID,k} = V_q^{MID,k'V} V_q^{11,k}; \text{ and}$$

$$R_q^k = V_q^{4,k'} V_q^{11,k}$$

Therefore:

$$Z_q^{MID,k} Z_q^{MID,k} = V_q^{4,k'} V_q^{MID,k} V_q^{MID,k'} V_q^{11,k} = R_q^k$$

Hence, to find $V_q^{MID,k}$, $R_q^k$ is decomposed into a precut of a unitary matrix $Z_q^{MID,k}$ times itself. To do so, the Eigen decomposition of $R_q^k$ is expressed as follows:

$$R_q^k = V_q^k D_q^k V_q^{k'}$$
$$= V_q^k \sqrt{D_q^k} \sqrt{D_q^k} V_q^{k'}$$
$$= V_q^k \sqrt{D_q^k} V_q^{k'} V_q^k \sqrt{D_q^k} V_q^{k'}$$

Consequently, $$Z_q^{MID,k} = V_q^k \sqrt{D_q^k} V_q^{k'}; \text{ and}$$

$$V_q^{MID,k} = V_q^{4,k} Z_q^{MID,k} = V_q^{4,k} V_q^k \sqrt{D_q^k} V_q^{k'}.$$

FIG. 3 is a flow chart describing an exemplary implementation of a wireless channel estimation process 300 incorporating features of the present invention. As shown in FIG. 3, the wireless channel estimation process 300 initially obtains channel estimation matrices, $H_{n_1}^k$ and $H_{n_2}^k$, corresponding locations, $n_1$ and $n_2$, of at least two reference signals during step 310.

Thereafter, the wireless channel estimation process 300 obtains the matrix, $G_n^k$, in the Eigen domain during step 320, where the matrix, $G_n^k$, is based on the channel estimation matrices, $H_{n_1}^k$ and $H_{n_2}^k$. The matrix, $G_n^k$, is inverted during step 330 by inverting the diagonal matrix, $D_n^k$, comprised of the Eigen values of the matrix, $G_n^k$, along its diagonal.

Finally, the filter coefficients are obtained at desired OFDM symbol locations during step 340 by multiplying the inverted matrix $G_n^{k-1}$, by the channel estimation matrices, $H_n^{k'}$.

CONCLUSION

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for obtaining filter coefficients at an $n^{th}$ symbol location and a $k^{th}$ sub-carrier, to compensate for a wireless channel, comprising:

obtaining channel estimation matrices, $H_{n_1}^k$ and $H_{n_2}^k$, at corresponding locations, $n_1$ and $n_2$, of at least two reference signals;

obtaining a matrix, $G_n^k$, in an Eigen domain, wherein said matrix, $G_n^k$, is based on said channel estimation matrices, $H_{n_1}^k$ and $H_{n_1}^k$, wherein said matrix, $G_n^k$, is obtained by interpolating $G_{n1}^k$ and $G_{n2}^k$ in said Eigen domain to at least one additional location;

inverting said matrix, $G_n^k$, by inverting a diagonal matrix, $D_n^k$, comprised of said Eigen values of said matrix, $G_n^k$, along its diagonal; and determining said filter coefficients using said inverted matrix $G_n^{k^{-1}}$, wherein at least one step of said method is performed by at least one hardware device.

2. The method of claim 1, wherein said determining step further comprises the step of determining said filter coefficients by multiplying said inverted matrix $G_n^{k^{-1}}$, by said channel estimation matrices, $H_n^{k'}$.

3. The method of claim 1, wherein said filter coefficients are obtained as follows:

$$M_n^k = H_n^{k'}(H_n^k H_n^{k'} + \sigma^2 I)^{-1},$$

where s is a noise variance constant.

4. The method of claim 1, wherein said matrix, $G_n^k$, is obtained as follows:

$$G_n^k = (H_n^k H_n^{k'} + \sigma^2 I)$$

where s is a noise variance constant.

5. The method of claim 1, wherein said inverted matrix, $G_n^k$, is obtained as follows:

$$G_n^{k^{-1}} = V_n^k D_n^{k^{-1}} V_n^{k'},$$

where $V_n^k$ is an Eigen vectors matrix and is a unitary matrix.

6. The method of claim 5, wherein said step of obtaining a matrix, $G_n^k$, in an Eigen domain further comprises the steps of:

performing a direct linear interpolation on a matrix, $\sqrt{D_q^{n,k}}$; and performing a geometric interpolation between column spaces of $V_q^{4,k}$ and $V_q^{11,k}$.

7. A system for obtaining filter coefficients at an $n^{th}$ symbol location and a $k^{th}$ sub-carrier, to compensate for a wireless channel, comprising:

a memory; and at least one processor, coupled to the memory, operative to:

obtain channel estimation matrices, $H_{n_1}^k$ and $H_{n_2}^k$, at corresponding locations, $n_1$ and $n_2$, of at least two reference signals, wherein said matrix, $G_n^k$, is obtained by interpolating $G_{n1}^k$ and $G_{n2}^k$ in said Eigen domain to at least one additional location;

obtain a matrix, $G_n^k$, in an Eigen domain, wherein said matrix, $G_n^k$, is based on said channel estimation matrices, $H_{n_1}^k$ and $H_{n_2}^k$;

invert said matrix, $G_n^k$, by inverting a diagonal matrix, $D_n^k$, comprised of said Eigen values of said matrix, $G_n^k$, along its diagonal; and determine said filter coefficients using said inverted matrix $G_n^{k^{-1}}$.

8. The system of claim 7, wherein said filter coefficients are determined by multiplying said inverted matrix $G_n^{k^{-1}}$, by said channel estimation matrices, $H_n^{k'}$.

9. The system of claim 7, wherein said filter coefficients are obtained as follows:

$$M_n^k = H_n^{k'}(H_n^k H_n^{k'} + \sigma^2 I)^{-1},$$

where s is a noise variance constant.

10. The system of claim 7, wherein said matrix, $G_n^k$, is obtained as follows:

$$G_n^k = (H_n^k H_n^{k'} + \sigma^2 I)$$

where s is a noise variance constant.

11. The system of claim 7, wherein said inverted matrix, $G_n^k$, is obtained as follows:

$$G_n^{k-1} = V_n^k D_n^{k-1} V_n^{k'},$$

where $V_n^k$ is an Eigen vectors matrix and is a unitary matrix.

12. The system of claim 11, wherein said matrix, $G_n^k$, is obtained in an Eigen domain by performing a direct linear interpolation on a matrix, $\sqrt{D_q^{n,k}}$; and performing a geometric interpolation between column spaces of $V_q^{4,k}$ and $V_q^{11,k}$.

13. An article of manufacture for obtaining filter coefficients at an $n^{th}$ symbol location and a $k^{th}$ sub-carrier, to compensate for a wireless channel, comprising a tangible non-transitory machine readable recordable storage medium containing one or more programs which when executed implement the steps of:
   obtaining channel estimation matrices, $H_{n_1}^k$ and $H_{n_2}^k$, at corresponding locations, $n_1$ and $n_2$, of at least two reference signals;
   obtaining a matrix, $G_n^k$, in an Eigen domain, wherein said matrix, $G_n^k$, is based on said channel estimation matrices, $H_{n_1}^k$ and $H_{n_2}^k$, wherein said matrix, $G_n^k$, is obtained by interpolating $G_{n_1}^k$ and $G_{n_2}^k$ in said Eigen domain to at least one additional location;
   inverting said matrix, $G_n^k$, by inverting a diagonal matrix, $D_n^k$, comprised of said Eigen values of said matrix, $G_n^k$, along its diagonal; and
   determining said filter coefficients using said inverted matrix $G_n^{k-1}$.

14. The article of manufacture of claim 13, wherein said determining step further comprises the step of determining said filter coefficients by multiplying said inverted matrix $G_n^{k-1}$, by said channel estimation matrices, $H_n^{k'}$.

15. The article of manufacture of claim 13, wherein said filter coefficients are obtained as follows:

$$M_n^k = H_n^{k'}(H_n^k H_n^{k'} + \sigma^2 I)^{-1},$$

where s is a noise variance constant.

16. The article of manufacture of claim 13, wherein said matrix, $G_n^k$, is obtained as follows:

$$G_n^k = (H_n^k H_n^{k'} + \sigma^2 I)$$

where s is a noise variance constant.

17. The article of manufacture of claim 13, wherein said inverted matrix, $G_n^k$, is obtained as follows:

$$G_n^{k-1} = V_n^k D_n^{k-1} V_n^{k'},$$

where $V_n^k$ is an Eigen vectors matrix and is a unitary matrix.

18. The article of manufacture of claim 17, wherein said step of obtaining a matrix, $G_n^k$, in an Eigen domain further comprises the steps of:
   performing a direct linear interpolation on a matrix, $\sqrt{D_q^{n,k}}$; and
   performing a geometric interpolation between column spaces of $V_q^{4,k}$ and $V_q^{11,k}$.

* * * * *